United States Patent
Zhang et al.

(10) Patent No.: US 10,715,358 B1
(45) Date of Patent: Jul. 14, 2020

(54) CIRCUIT FOR AND METHOD OF RECEIVING SIGNALS IN AN INTEGRATED CIRCUIT DEVICE

(71) Applicant: Xilinx, Inc., San Jose, CA (US)

(72) Inventors: Wenfeng Zhang, San Jose, CA (US);
Stanley Y. Chen, Cupertino, CA (US);
Hsung Jai Im, San Jose, CA (US);
Parag Upadhyaya, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/205,020

(22) Filed: Nov. 29, 2018

(51) Int. Cl.
*H04L 25/03* (2006.01)

(52) U.S. Cl.
CPC .. *H04L 25/03057* (2013.01); *H04L 25/03159* (2013.01); *H04L 2025/03522* (2013.01)

(58) Field of Classification Search
CPC ............... H04L 25/03885; H04L 27/01; H04L 25/03057; H04L 2025/03535; H04L 2025/03522; H04L 25/03159
USPC .......................................... 375/229–233, 250
See application file for complete search history.

(56) References Cited

U.S. PATENT DOCUMENTS

| | | | | |
|---|---|---|---|---|
| 6,011,435 A * | 1/2000 | Takeyabu | ............ | H03F 3/45475 330/252 |
| 6,424,480 B1 * | 7/2002 | Bhandari | ......... | G11B 20/10009 360/67 |
| 6,480,178 B1 * | 11/2002 | Itakura | ................ | G09G 3/3688 345/89 |
| 7,486,267 B2 * | 2/2009 | Chen | .................... | G09G 3/3677 345/100 |
| 7,642,846 B2 * | 1/2010 | Yan | ..................... | H03F 3/45183 330/253 |
| 7,667,914 B2 * | 2/2010 | Contreras | ................ | G11B 5/02 360/46 |
| 7,973,569 B1 * | 7/2011 | Bashar | ................. | H03K 3/3565 327/67 |
| 8,995,514 B1 | 3/2015 | Asuncion | | |
| 9,054,645 B1 | 6/2015 | Wang | | |
| 9,203,352 B1 * | 12/2015 | Hoang | ................ | H03F 3/45475 |
| 9,313,054 B1 | 4/2016 | Liao | | |
| 9,325,489 B2 | 4/2016 | Hsieh | | |
| 9,461,851 B1 | 10/2016 | Liao | | |
| 9,602,314 B1 * | 3/2017 | Chang | ............... | H04L 25/03019 |
| 9,780,886 B2 * | 10/2017 | Hidri | .................... | H04B 10/693 |
| 9,806,915 B1 | 10/2017 | Elzeftawi | | |
| 9,876,656 B1 | 1/2018 | Freitas | | |
| 9,966,908 B1 | 5/2018 | Carey | | |
| 2002/0109075 A1 * | 8/2002 | Ono | ....................... | H03F 3/087 250/214 A |

(Continued)

*Primary Examiner* — Emmanuel Bayard
(74) *Attorney, Agent, or Firm* — John J. King

(57) ABSTRACT

A circuit for receiving signals in an integrated circuit device. The circuit comprises a first equalizer circuit having a first input for receiving a first input signal and generating an output signal at a first output; a second equalizer circuit having a second input for receiving the output signal generated at the first output of the first equalizer circuit and having a second output; and a control circuit having a control output coupled to the second output of the second equalizer circuit; wherein the control circuit provides an offset cancellation signal or a loopback signal to the second output of the second equalizer circuit. A method of receiving signals in an integrated circuit is also described.

20 Claims, 3 Drawing Sheets

(56) References Cited

U.S. PATENT DOCUMENTS

| | | | |
|---|---|---|---|
| 2005/0047801 A1* | 3/2005 | Schrodinger | H04B 10/6933 398/202 |
| 2005/0107056 A1* | 5/2005 | Okasaka | H03G 3/3078 455/251.1 |
| 2006/0216042 A1* | 9/2006 | Yeo | H03G 3/3084 398/209 |
| 2013/0084080 A1* | 4/2013 | Shibutani | H04B 10/6161 398/208 |
| 2013/0142522 A1* | 6/2013 | Itabashi | H04B 10/60 398/209 |
| 2014/0256276 A1* | 9/2014 | Li | H04B 3/30 455/230 |

* cited by examiner

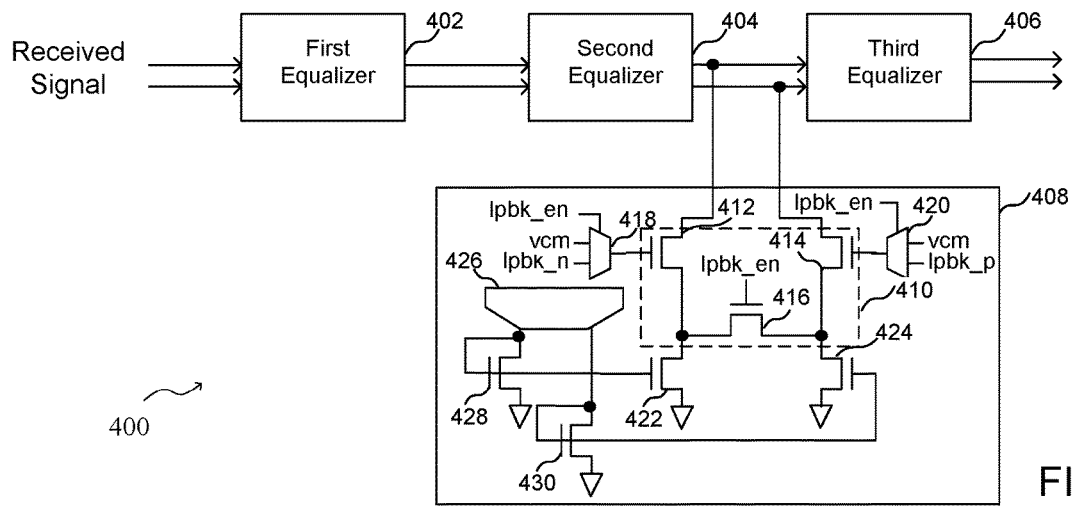
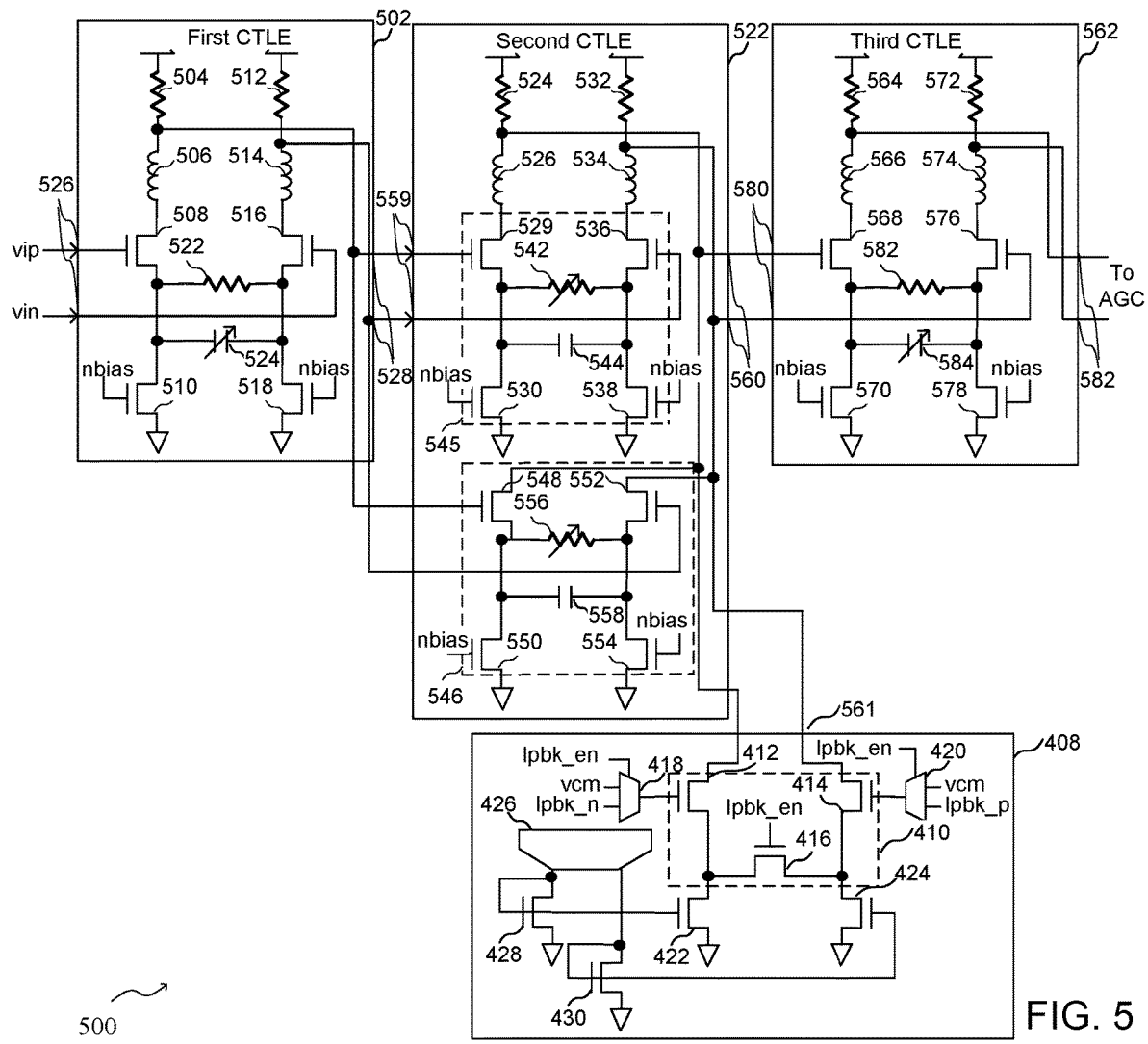

CIRCUIT FOR AND METHOD OF RECEIVING SIGNALS IN AN INTEGRATED CIRCUIT DEVICE

TECHNICAL FIELD

The present invention relates generally to integrated circuit devices, and in particular, to a circuit for and a method of receiving signals in an integrated circuit device.

BACKGROUND

The transmission of data is an important function of an integrated circuit device. A number of factors may affect not only the operation of a receiver circuit of an integrated circuit device, but also the operation and implementation of the integrated circuit device itself. One factor that effects the operation of the receiver is the loading of the receiver. The loading can affect the power required to drive the receiver circuit. The loading can also affect the bandwidth. That is, resistance and capacitance (RC) loading at nodes of the receiver circuit receiving a signal can reduce the bandwidth of the signals received by the receiver circuit.

Accordingly, there is a need for circuits for and methods of receiving signals in an integrated circuit device that overcome the deficiencies of conventional receiver circuits in integrated circuit devices.

SUMMARY

A circuit for receiving signals in an integrated circuit device. The circuit comprises a first equalizer circuit having a first input for receiving a first input signal and generating a first output signal at a first output; a second equalizer circuit having a second input for receiving the first output signal generated at the first output of the first equalizer circuit and having a second output; and a control circuit having a control output coupled to the second output of the second equalizer circuit; wherein the control circuit provides an offset cancellation signal or a loopback signal to the output of the second equalizer circuit.

A method of receiving signals in an integrated circuit device is also disclosed. The method comprises configuring a first equalizer circuit to receive an input signal and generate a first output signal at a first output; coupling a second equalizer circuit to the first equalizer circuit, wherein the second equalizer circuit has a second input for receiving the output signal generated at the first output of the first equalizer circuit and having a second output; and coupling a control circuit to the second output of the second equalizer circuit; wherein the control circuit provides an offset cancellation signal or a loopback signal to the second output of the second equalizer circuit.

BRIEF DESCRIPTION OF THE DRAWINGS

FIG. 4 is a block diagram of a receiver circuit showing an exemplary offset control and loopback circuit coupled between a second and third equalizer circuits;

FIG. 5 is a block diagram of a receiver circuit having an offset control and loopback circuit coupled between a second and third continuous time linear equalizer circuits.

DETAILED DESCRIPTION

The circuits and methods for receiving signals in an integrated circuit device reduce the loading in a receiver circuit by share the frontend loopback circuit and an offset cancellation circuit of the receiver circuit. By sharing the circuit for both front end loopback and offset cancellation, the loading of an equalizer of the receiver is reduced. The sharing of the circuits not only simplifies design, saves power and area, but also improves the bandwidth of the receiver, which is beneficial in 56 Gigabit and 112 Gigabit pulse amplitude modulation (PAM) transceiver designs for example.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
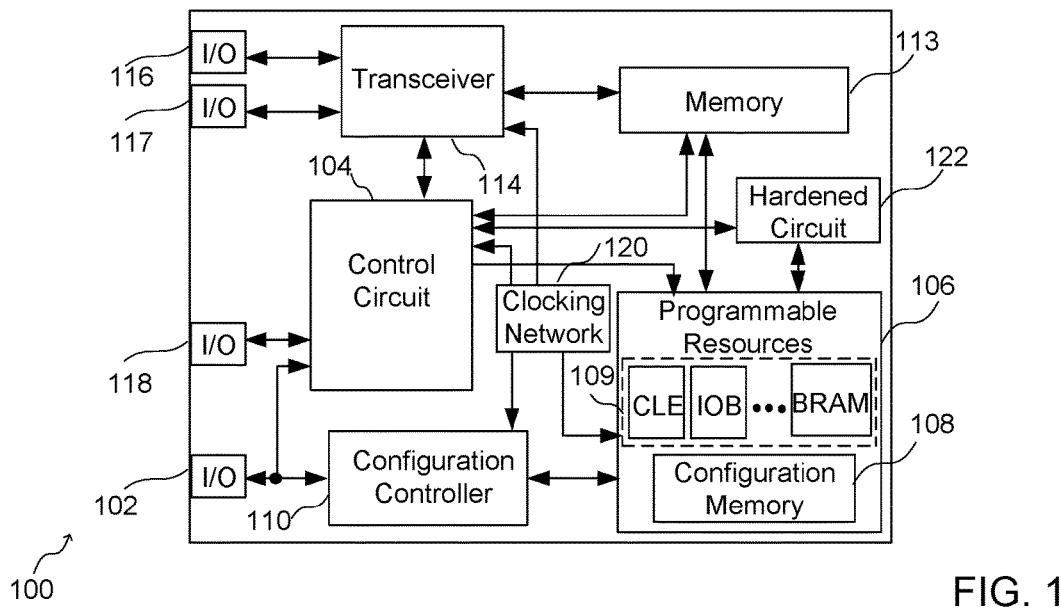
FIG. 1 is a block diagram of an integrated circuit having circuits for receiving signals.

Turning first to FIG. 1, a block diagram of an integrated circuit having circuits that may require a voltage divider is shown. In particular, an input/output port 102 is coupled to a control circuit 104 that controls programmable resources 106 having configurable logic elements 109 and other programmable resources, such as input/output blocks (IOBs) and blocks of random access memory (BRAMs). Configuration data may be provided to the configuration memory 108 by a configuration controller 110. The configuration data enables the operation of the programmable resources 106. A memory 113 may be coupled to the control circuit 104 and the programmable resources 106. A transceiver circuit 114, which comprises a transmitter and a receiver, may be coupled to the control circuit 104, programmable resources 106 and the memory 113, and may receive signals at the integrated circuit by way of I/O ports 116 and 117. Other I/O ports may be coupled to circuits of the integrated circuit device, such as I/O port 118 that is coupled to the control circuit 104 as shown. A clocking network 120 is coupled to various elements of the circuit of FIG. 1. The circuit of FIG. 1 includes examples of circuits that may require DC voltages to be stepped down, such as in an input/output port for example. While the circuit of FIG. 1 is provided by way of example, other circuits of implementing an integrated circuit device having a transceiver may be used.

Figure 2:
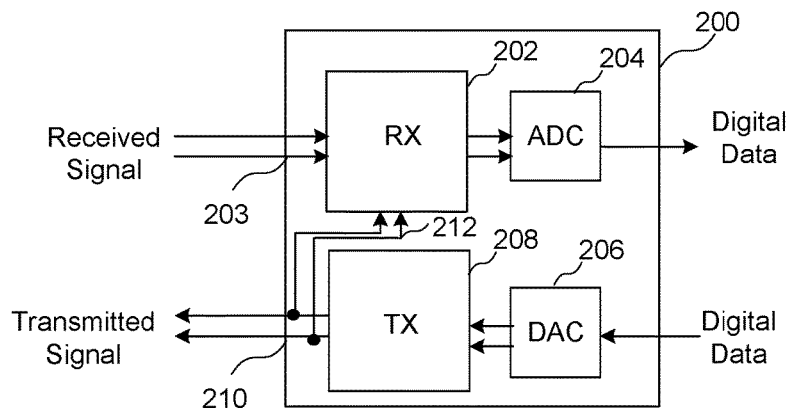
FIG. 2 is a block diagram of a transceiver that may be implemented in the circuit of FIG. 1.

Turning now to FIG. 2, a block diagram of a transceiver 200 is shown, where the transceiver may be implemented as transceiver 114 of FIG. 1 for example. The transceiver 200 may comprise a receiver 202 having an input 203 adapted to receive an input signal (received signal), shown here by way of example as a differential signal, such as an analog differential signal received at differential inputs, wherein outputs of an equalizer circuit may comprise differential outputs. An output of the receiver 202 is provided to an analog-to-digital converter (ADC) circuit 204 that generates the received digital data. The transceiver may also comprise a transmitter adapted to receive other digital data that is used to generate a transmitted signal, which may also be an analog digital signal. More particularly, a digital-to-analog converter (DAC) circuit 206 has an input adapted to receive the digital data to be transmitted. An analog output of the DAC is coupled to a transmitter 208, which generates the transmitted signal at an output 210. A loopback path 212 provides a path from the transmitter 208 to be the receiver 202, as will be described in more detail below. The circuits and methods for receiving signals in an integrated circuit device as will be described in more detail below can be implemented in the receiver 202 of FIG. 2.

Figure 3:
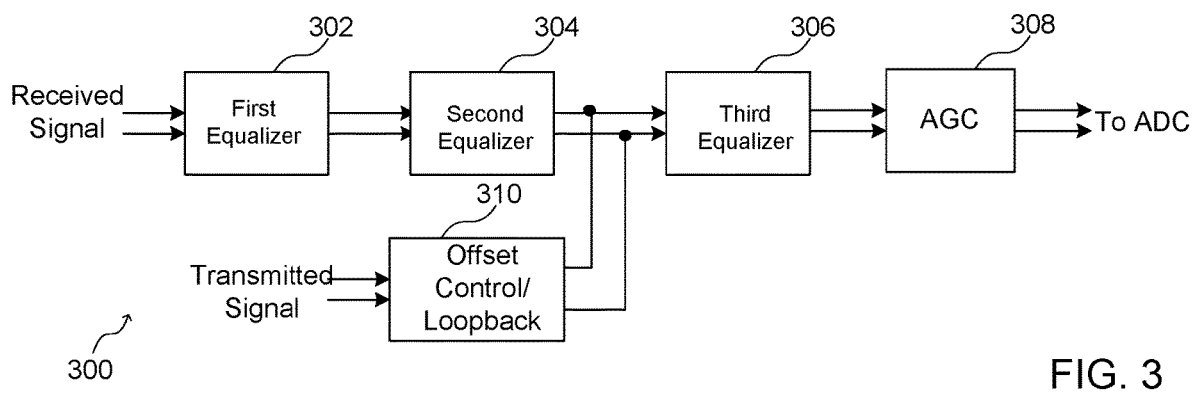
FIG. 3 is a block diagram of a receiver circuit having an offset control and a loopback circuit.

Turning now to FIG. 3, a block diagram of a receiver circuit 300 having an offset control and a loopback circuit is shown. The receiver circuit may be implemented in the receiver 202 for example, and may comprise a plurality of equalizers adapted to provide equalization for signals in different frequency ranges. For example, a first equalizer 302 may be adapted to provide equalization of the received signal in a first frequency range, a second equalizer 304 may be adapted to provide equalization of the received signal in a second frequency range, and a third equalizer 306 may be adapted to provide equalization of the received signal in a third frequency range. An output of the third equalizer 306 is provided to an automatic gain control (AGC) circuit 308. According to one implementation, the first equalizer 302 and the third equalizer 306 may be for high frequency signals, and the second equalizer 304 may be for medium frequency signals, as will be described in more detail in reference to FIG. 5. An offset control and loopback circuit 310 is coupled to the equalizers, shown here at the output of the second equalizer 304. By combining the offset control functionality and the loopback functionality in a circuit that are coupled to the same input nodes of the receiver, and therefore provide loading nodes of a single equalizer, the loading of the receiver is reduced, and therefore reducing the power and area of the receiver while improving the bandwidth of the receiver.

Turning now to FIG. 4, a block diagram of a portion of a receiver circuit 400 shows an exemplary offset control and loopback circuit coupled between a second and third equalizer circuits. As shown in FIG. 4, a first equalizer 402, a second equalizer 404 and a third equalizer 406 are coupled in series, where an offset control and loopback circuit 408 is coupled to the inputs the third equalizer 406. The offset control and loopback circuit 408 (which may be implemented as the control circuit of FIG. 3 for example) comprises a combined offset control and loopback portion 410 having a first transistor 412 with a drain coupled to a first output of the second equalizer 404 and a second transistor 414 coupled to a second output of the second equalizer 404. A loopback transistor 416 is coupled between the sources of the transistors 412 and 414 to enable a loopback arrangement when the transistor 416 is turned on to create an electrical path between the sources of the transistors 412 and 414 during a loopback operation, as will be described in more detail below. The offset control and loopback circuit 408 also comprises selection circuits for coupling control signals to gates of transistors 412 and 414. For example, a first selection circuit 418 is configured to receive signals to enable the offset control and loopback circuit 408 to function to provide offset control or to provide a loopback signal. The first selection circuit 418 is configured to receive a voltage that would be coupled to the gate of the transistor 412 when providing offset control and a data value from a transmitter, such as a corresponding transmitter of the transceiver having the receiver 400, when providing loopback control.

According to one implementation, the selection circuit 418 may comprise a multiplexer configured to receive a voltage, shown here by way of example as a common mode voltage (vcm) for operating the transistor 412 to provide offset control, and to receive transmitter data (Ipbk_n) to be provided to the output of the second equalizer circuit during loopback operation. The selection circuit 420 may comprise a multiplexer configured to receive a voltage, shown here by way of example as the common mode voltage (vcm) for operating the transistor 414 to provide offset control, and to receive transmitter data (Ipbk_p) to be provided to the output of the third equalizer circuit during loopback operation.

According to some implementations, the equalizers may be implemented using current mode logic (CML), where n and p outputs of the offset control and loopback circuit 408 (i.e. the output signals which may comprises control output signals at the drains of the transistors 412 and 414) are at the same common mode voltage (vcm). The vcm value can also be selected to provide offset cancellation, and in particular to provide for DC offset cancellation. The selection circuits 418 and 420 are controlled by the loopback enable (Ipbk_en) signal coupled to control inputs of the selection circuits, where the data values from the transmitter are selected when the circuit is operating in a loopback mode. That is, the inputs at the gates of the transistors 412 and 414 will toggle as data that would be generated at the output of a transmitter is provided as a loopback to the receiver, for example to test the transmitter. The data signals could be provided in a loopback to the receiver (such as to the selection circuits 418 and 420) as shown in FIG. 2.

The offset control and loopback circuit 408 also comprises circuit elements that provide current to the combined offset control and loopback portion 410. A pair of transistors are included to provide a tail current in the current paths created by transistors 412 and 414. More particularly, a transistor 422 is coupled between the source of the transistor 412 and a ground (GND) voltage, and a transistor 424 is coupled between the source of the transistor 414 and the ground voltage. The gates of the transistors 422 and 424 are coupled to current sources created by a reference current source 426 coupled to the drains of transistors 428 and 430, where the gate of the transistor 428 is coupled to the source of the transistor 428 and the gate of the transistor 422 and the gate of the transistor 430 is coupled to the source of the transistor 430 and the gate of the transistor 424. Transistors 422 and 424 operate as a transconductance (gm) pair in the loopback mode. The reference current source 426 provides a current to the transistors 428 and 430 configured as diodes, where the current in transistor 428 and 430 are mirrored in the transistors 422 and 424, respectively. In the offset cancellation mode, the correct biasing voltage is provided to control the tail current devices (i.e. transistors 422 and 424).

According to one implementation, the circuit elements providing offset control function may be turned on in normal operation mode, but may be turned off in internal loop back test mode. In normal operation mode (i.e. when Ipbk_en=0 to turn off the transistor 416), the inputs to the gates of transistor 412 and 414 are connected to a common mode voltage, and offset control and loopback circuit 408 acts as an offset (OS) and a baseline wander (BLW) correction DAC. In this mode, the first equalizer receives input data at differential receiver inputs and feeds the outputs to next stage (i.e. the second equalizer 404). The second equalizer 404 adds its output with OS/BLW correction from offset control and loopback circuit 408 and drives the outputs to the next stage (i.e. the third equalizer 406). In an internal loopback test mode (i.e. when Ipbk_en=1), transistor 416 is turned on and the inputs of transistors 412 and 414 are switched to receive the loopback data Ipbk_p/Ipbk_n. The first equalizer 402 and the second equalizer 404 may be turned off and combined offset control and loopback portion 410 acts as loopback data buffer which drives the third equalizer 406 with TX data for testing link functionality.

The circuit of FIG. 4 comprises both the first equalizer 402 and the third equalizer 406 for the high frequency band, where each equalizer may only have a maximum peaking of 6 dB, and a total of 12 dB is needed for a long reach channel (or a high loss channel). The output of the offset control and loopback circuit 408 is provided at the outputs of the second equalizer 404 because the equalizers for the high frequency equalizers (i.e. equalizer 402 and 406) are more sensitive to capacitive loading. The data rates for first equalizer 402 and the third equalizer 406 may be from approximately 10 gigabits/second (Gbps) to 56 Gbps for example. The peak frequency for the first equalizer 402 and the third equalizer 406 may be approximately 15 Gigahertz (GHz) and the peak frequency for the second equalizer is approximately 3.5 GHz.

Turning now to FIG. 5, a block diagram of a receiver circuit 500 having an offset control and loopback circuit coupled between a second and third continuous time linear equalizer circuits is shown. According to the implementation of FIG. 5, a first equalizer 502, a second equalizer 522 and a third equalizer 562 comprise continuous time linear equalizers (CTLEs), which may have CML functionality as shown. More particularly, the first equalizer 502 comprises a pair of current paths, where a first current path comprises a resistor 504 coupled between a reference voltage and an inductor 506, which are also coupled to a pair of transistors 508 and 510 coupled in series, and a second current path comprises a resistor 512 coupled between a reference voltage and an inductor 514, which are also coupled to a pair of transistors 516 and 518 coupled in series. A resistor 522 and a variable capacitor 524 are coupled in parallel between the sources of the transistors 508 and 516. The gates of the transistors 508 and 516 are coupled to receive the received signal vip and yin, respectively, which may be an analog input signal for example, at an input 526. A bias signal (nbias) is provided to the gates of the transistors 510 and 518. An output of the first equalizer 502 is generated at a first output 528.

The second equalizer 522 comprises a pair of current paths, where a first current path comprises a resistor 524 coupled between a reference voltage and an inductor 526, which are also coupled to a pair of transistors 529 and 530 coupled in series, and a second current path comprises a resistor 532 coupled between a reference voltage and an inductor 534, which are also coupled to a pair of transistors 536 and 538 coupled in series. A variable resistor 542 and a capacitor 544 are coupled in parallel between the sources of the transistors 529 and 536. The gates of the transistors 529 and 536 are coupled to receive the outputs of the first equalizer 502 at an input 559. A bias signal (nbias) is provided to the gates of the transistors 530 and 538. A second output of the second equalizer 522 (generated at the node between the resistor 524 and the inductor 526 and the node between the resistor 523 and the inductor 534) is generated at a second output 560.

In addition to the first equalizer portion 545 that may provide equalization for mid-range frequencies, a second equalizer portion 546 may implemented to provide equalization for low-range frequencies. More particularly, the second equalizer portion may comprise a transistor 548 coupled in series with a transistor 550 and a transistor 552 coupled in series with a transistor 554, where a variable resistor 556 is coupled in parallel with a capacitor 558 between the sources of the transistors 548 and 552. The gates of the transistors 548 and 552 are coupled to receive first output signal at the outputs 528, and the output signal at the drains of transistors 548 and 552 may be coupled to the output 560 to generate the second output signal. A control output 561 of the control circuit 408 is coupled to the output 560, where a control output signal generated at the output 561 may provide a cancellation signal or a loopback signal, as will be described in more detail below.

The third equalizer 562 comprises a pair of current paths, where a first current path comprises a resistor 564 coupled between a reference voltage and an inductor 566, which are also coupled to a pair of transistors 568 and 570 coupled in series, and a second current path comprises a resistor 572 coupled between a reference voltage and an inductor 574, which are also coupled to a pair of transistors 576 and 578 coupled in series. A resistor 582 and a variable capacitor 584 are coupled in parallel between the sources of the transistors 568 and 576. The gates of the transistors 568 and 576 are coupled to receive the outputs of the second equalizer 522 at an input 580. A bias signal (nbias) is provided to the gates of the transistors 570 and 578. An output of the third equalizer 562 is generated at an output 582. According to some implementations, the parallel resistor 522 and capacitor 524 and parallel resistor 582 and 584 of the first and second equalizers 502 and 562 could be approximately 100 Ohms and between 2 and 128 femptoFarads (fF), respectively, and the pullup resistors 504, 512, 564, and 572 could be approximately 100 Ohms and inductors 506, 514, 566 and 574 could be approximately 800 nanoHenries (nH), for example. The capacitors 524, 544 and 584 are variable capacitors to enable the selection of a peaking frequency. While the resistors 522, 542 and 582 are selected for DC gain, the DC gain of the first equalizer 502 and the third 506 may be fixed. The value for the resistors 542 and 566 are selected to provide a DC gain.

Figure 6:
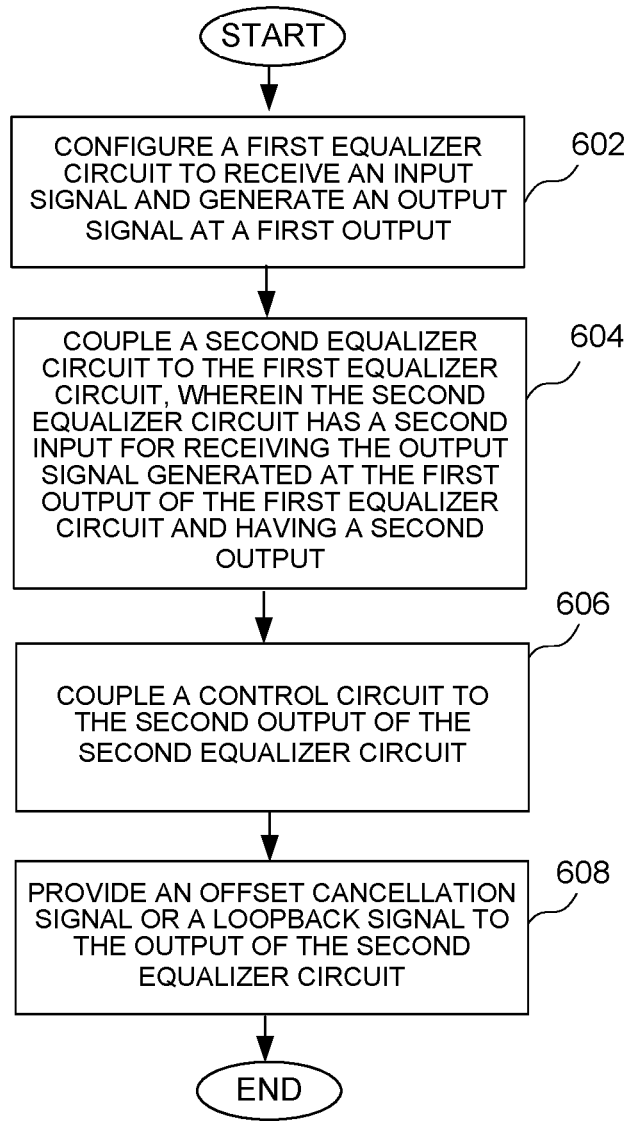
FIG. 6 is a flow chart showing a method of implementing a receiver circuit in an integrated circuit device.

Turning now to FIG. 6, a flow chart shows a method of implementing a receiver circuit in an integrated circuit device. More particularly, a first equalizer circuit, such as equalizer circuit 402 or 502 for example, is configured to receive an input signal and generate an output signal at a first output at a block 602. A second equalizer circuit, such as equalizer 404 or 522 for example, is coupled to the first equalizer circuit, wherein the second equalizer circuit has a second input for receiving the output signal generated at the first output of the first equalizer circuit and having a second output at a block 604. A control circuit, such as control circuit 408 for example, is coupled to the second output of the second equalizer circuit at a block 606. An offset cancellation signal or a loopback signal is provided to the output of the second equalizer circuit at a block 608.

The first equalizer circuit comprises a high frequency equalizer and the second equalizer circuit comprises a low and medium frequency equalizer, wherein the second equalizer circuit comprises a low frequency equalizer portion and a medium frequency equalizer portion. The method may further comprise coupling a third equalizer circuit to an output of the second equalizer circuit, the third equalizer circuit having an input for receiving an output signal generated at the second output of the second equalizer circuit, wherein the third equalizer circuit comprises a high frequency equalizer. The control circuit may be configured for operating in a first mode for providing offset cancellation and for operating in a second mode for providing loopback control. According to some implementations, the control circuit comprises a selection circuit coupled to receive an offset cancellation signal and a loopback signal. The method may further comprise coupling a transmitter to the output of the second equalizer circuit, wherein an output of the transmitter is coupled to the output of the second equalizer circuit during a loopback operation.

The method of FIG. 6 may be implemented using the circuits of FIGS. 1-5 as described, or using some other suitable circuits. While specific elements of the method are described, it should be understood that additional elements of the method, or additional details related to the elements, could be implemented according to the disclosure of FIGS. 1-5.

It can therefore be appreciated that new circuits for and methods of receiving signals in an integrated circuit device have been described. It will be appreciated by those skilled in the art that numerous alternatives and equivalents will be seen to exist that incorporate the disclosed invention. As a result, the invention is not to be limited by the foregoing implementations, but only by the following claims.

What is claimed is:

1. A circuit for receiving signals in an integrated circuit device, the circuit comprising:
    a first equalizer circuit having a first input for receiving a first input signal and generating a first output signal at a first output;
    a second equalizer circuit having a second input for receiving the first output signal generated at the first output of the first equalizer circuit and having a second output; and
    a control circuit having a control output coupled to the second output of the second equalizer circuit;
    wherein the control circuit provides an offset cancellation signal and a loopback signal to the second output of the second equalizer circuit, and the loopback signal comprises an output of a transmitter of the integrated circuit device.

2. The circuit of claim 1, wherein the first equalizer circuit comprises a high frequency equalizer and the second equalizer circuit comprises a low and medium frequency equalizer.

3. The circuit of claim 2, wherein the second equalizer circuit comprises a low frequency equalizer portion and a medium frequency equalizer portion.

4. The circuit of claim 2, further comprising a third equalizer circuit having a third input for receiving a second output signal generated at the second output of the second equalizer circuit, wherein the third equalizer circuit comprises a high frequency equalizer.

5. The circuit of claim 1, wherein the control circuit comprises a configurable circuit for operating in a first mode for providing offset cancellation and for operating in a second mode for providing loopback control.

6. The circuit of claim 5, wherein the control circuit comprises a selection circuit coupled to receive the offset cancellation signal and the loopback signal.

7. The circuit of claim 5, wherein the second output of the second equalizer circuit comprises a differential output, the circuit further comprising a first plurality of transistors coupled in series to a first differential output of the second output and a second plurality of transistors coupled in series to a second differential output of the second output, wherein a first transistor of the first plurality of transistors is configured to receive one of a first offset control signal and a first loopback signal and a first transistor of the second plurality of transistors is configured to receive one of a second offset control signal and a second loopback signal.

8. The circuit of claim 7, further comprising a switch configured between a drain of the first transistor of the first plurality of transistors and a drain of the first transistor of the second plurality of transistors, wherein the switch enables coupling the drain of the first transistor of the first plurality of transistors to the drain of the first transistor of the second plurality of transistors during the second mode for providing loopback control.

9. The circuit of claim 7, further comprising a second transistor of the first plurality of transistors coupled between a drain of the first transistor of the first plurality of transistors and ground, and a second transistor of the second plurality of transistors coupled between the first transistor of the second plurality of transistors and ground, wherein the second transistor of the first plurality of transistors and the second transistor of the second plurality of transistors are controllable during the first mode for providing offset cancellation.

10. The circuit of claim 1, further comprising the transmitter, wherein a transmitter output of the transmitter is coupled to the second output of the second equalizer circuit during a loopback operation.

11. A method of receiving signals in an integrated circuit device, the method comprising:
    configuring a first equalizer circuit to receive a first input signal and generate a first output signal at a first output;
    coupling a second equalizer circuit to the first equalizer circuit, wherein the second equalizer circuit has a second input for receiving the first output signal generated at the first output of the first equalizer circuit and having a second output; and
    coupling a control circuit to the second output of the second equalizer circuit;
    wherein the control circuit provides an offset cancellation signal and a loopback signal to the second output of the second equalizer circuit, and the loopback signal comprises an output of a transmitter of the integrated circuit device.

12. The method of claim 11, wherein the first equalizer circuit comprises a high frequency equalizer and the second equalizer circuit comprises a low and medium frequency equalizer.

13. The method of claim 12, wherein the second equalizer circuit comprises a low frequency equalizer portion and a medium frequency equalizer portion.

14. The method of claim 12, further comprising coupling a third equalizer circuit to the second output of the second equalizer circuit, the third equalizer circuit having a third input for receiving a second output signal generated at the second output of the second equalizer circuit, wherein the third equalizer circuit comprises a high frequency equalizer.

15. The method of claim 11, further comprising configuring the control circuit for operating in a first mode for providing offset cancellation and for operating in a second mode for providing loopback control.

16. The method of claim 15, wherein the control circuit comprises a selection circuit coupled to receive the offset cancellation signal and the loopback signal.

17. The method of claim 15, wherein the second output of the second equalizer circuit comprises a differential output, the control circuit further comprising a first plurality of transistors coupled in series to a first differential output of the second output and a second plurality of transistors coupled in series to a second differential output of the second output, wherein a first transistor of the first plurality of transistors is configured to receive one of a first offset signal and a first loopback signal and a first transistor of the second plurality of transistors is configured to receive one of a second offset signal and a second loopback signal.

18. The method of claim 17, further comprising configuring a switch between a drain of the first transistor of the first plurality of transistors and a drain of the first transistor of the second plurality of transistors, wherein the switch enables coupling the drain of the first transistor of the first plurality of transistors to the drain of the first transistor of the second plurality of transistor during the second mode for providing loopback control.

19. The method of claim 17, further comprising coupling a second transistor of the first plurality of transistors between a drain of the first transistor of the first plurality of transistors and ground, and coupling a second transistor of the second plurality of transistors between the first transistor of the second plurality of transistors and ground, wherein the second transistor of the first plurality of transistors and the second transistor of the second plurality of transistors are controllable during the first mode of offset cancellation.

20. The method of claim 11, further comprising coupling the transmitter to the second output of the second equalizer circuit, wherein an output of the transmitter is coupled to the second output of the second equalizer circuit during a loopback operation.

* * * * *